United States Patent [19]

Khutoretsky et al.

[11] 4,350,910
[45] Sep. 21, 1982

[54] ELECTRICAL MACHINE STATOR

[76] Inventors: Garry M. Khutoretsky, ulitsa Altaiskaya, 20, kv. 5; Jury G. Tjurin, ulitsa Rudneva, 11, kv. 56; Larisa A. Drozdova, prospekt K. Marxa, 25, kv. 26; Tamara N. Belova, ulitsa Budapeshtskava, 3, korpus 2, kv. 138, all of Leningrad, U.S.S.R.

[21] Appl. No.: 296,877

[22] Filed: Aug. 27, 1981

[51] Int. Cl.³ ............................................. H02K 9/00
[52] U.S. Cl. .................................................... 310/64
[58] Field of Search ............................. 310/57, 64, 65

[56] References Cited
U.S. PATENT DOCUMENTS
3,652,881 3/1972 Albright et al. .................. 310/64 X FOREIGN PATENT DOCUMENTS
2542483 4/1977 Fed. Rep. of Germany.
252452 of 1968 U.S.S.R. .

Primary Examiner—Donovan F. Duggan
Attorney, Agent, or Firm—Fleit & Jacobson

[57] ABSTRACT

An electrical machine stator comprising a core having coolers attached to the outer lateral surface thereof by means of detachable resilient fastening means including each a rigid member attached to the core, a resilient member mounted on the cooler and an adjusting means movably connected with the rigid member and being in contact with the resilient member to provide continuous pressing of the cooler in a radial direction.

1 Claim, 2 Drawing Figures

ELECTRICAL MACHINE STATOR

FIELD OF THE INVENTION

The present invention is in the field of electrical engineering and is particularly concerned with electrical machine stators.

The best results can be achieved with the invention used in turbo- and hydro-generators.

DESCRIPTION OF THE PRIOR ART

One of the ways to raise the power of an electrical machine, e.g. turbogenerator, is to increase the dimensions of its active parts, which causes an increase in the overall dimensions of the turbogenerator as a whole.

The most effective way to enhance the power of the turbogenerator without a substantial increase in its dimensions is direct cooling of the turbogenerator windings, providing direct contact of a cooling medium (gas or liquid) with the winding conductors, thus removing heat therefrom.

Another way to raise the power of the turbogenerator resides in cooling the stator core. This can be achieved by radial air ducts provided between stacked laminations made of electrical-sheet steel and forming in combination the stator core. The air ducts are formed through the use of distance bars producing a space between the stacked laminations and serving to pass cooling air or gas therethrough.

The core of the turbogenerator stator can be also cooled by the use of axial air ducts made in the stacked laminations forming the core.

However, increasing efficiency of the turbogenerator generated a need for liquid cooling of its stator core, in the sense that the efficiency of cooling sharply increases if distilled water is used as a cooling medium since heat conductivity of distilled water is 50 times higher than that of air and 16 times higher than that of hydrogen at 1.1 atm.

For this purpose, there is well known in the practice of electrical engineering the application of coolers mounted on the outer lateral surface of the turbogenerator stator core.

Known to the prior art is an electrical machine stator disclosed in the FRG Application No. 2,542,483, Cl.H02K 9/00 published 1977, comprising a core provided with coolers attached to the outer lateral surface thereof by means of fastening means.

Here, the fastening means is a layer of insulating adhesive applied to the outer lateral surface of the core. When setting, the adhesive provides a rigid connection between the cooler and the core.

However, the electrical machine vibrations developing during its operation may result in the fault of the insulating adhesive layer, which causes disturbance of the connection between the coolers and the core resulting in a decreased reliability of the electrical machine in the course of operation.

Noteworthy is to mention that the application of the insulating adhesive layer to the outer lateral surface of the core is associated with great manufacturing difficulties and is a very labour-consuming operation. As a result attachment of the coolers to the core presents a severe problem under mounting and operation conditions of the electrical machine.

Another solution to the problem has been proposed in the USSR Inventor's Certificate No. 252,452, Intl.Cl. H02K 1/20 published 1968, wherein the stator comprises a core provided with coolers attached thereto by means of detachable resilient fastening means.

Each of the fastening means is a frame made from a resilient sheet material, embracing the cooler and attached to the core by fasteners.

Such fastening means provide the easy and simple attachment of the coolers to the core during mounting and operating conditions of the electrical machine.

However, the elasticity of the fastening means falls off in the course of the electrical machine operation. This involves a decrease in the force pressing the cooler against the core, which in turn leads to the fault of the tight contact therebetween, and the result is a decreased efficiency of the stator core cooling.

SUMMARY OF THE INVENTION

Accordingly, it is an object of the present invention to provide an electrical machine stator ensuring an increasing efficiency of the stator core cooling.

With this and other object in view, there is provided an electrical machine stator comprising a core with coolers attached to the outer lateral surface thereof by means of detachable resilient means, wherein, according to the invention, each of the detachable resilient fastening means includes a rigid member attached to the core, a resilient member mounted on the cooler and an adjusting means movably connected to the rigid member and being in contact with the resilient member to provide continuous pressing of the resilient member to the cooler in a radial direction.

The adjusting means provided in the detachable resilient fastening means, makes it possible to adjust, throughout the operation of the electrical machine, a force pressing the resilient member to the cooler and, hence, to adjust a force pressing the latter to the outer lateral surface of the core. The force pressing the resilient member to the cooler goes down as the elasticity of the resilient member is reduced in the course of operation of the electrical machine, and the result is a decrease in the force pressing the cooler to the core, this leading to the fault of the tight contact therebetween. By turning the adjusting means relative to the rigid member, it is possible, however, to step up the force pressing the resilient member to the cooler, whereby tight contact between the cooler and the core is regained.

The above-mentioned and other features and objects of this invention and the manner of attaining will become more apparent and the invention itself will be better understood by reference to the following description of illustrated embodiments, taken in conjunction with the accompanying drawings; wherein:

DESCRIPTION OF THE PREFERRED EMBODIMENT

Figure 1:
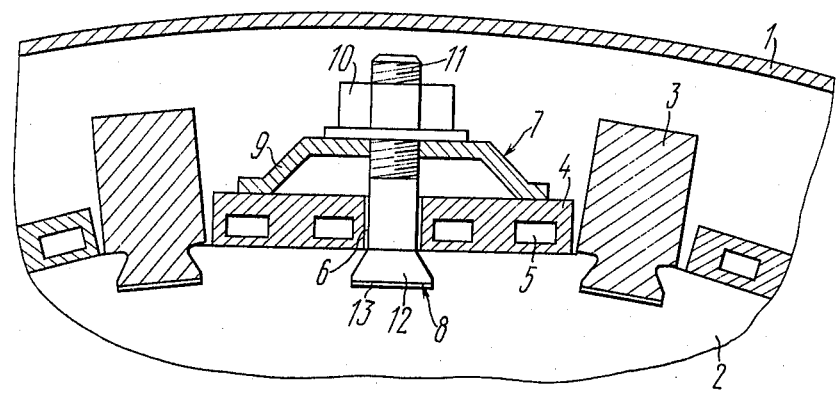
FIG. 1 is an end view, partially in section, of an electrical machine stator embodying one form of the present invention.

As seen in the embodiment revealed by FIG. 1, the electrical machine stator comprises a housing 1 accommodating a core 2 formed from a number of identical stacked laminations shaped like sectors stamped from electrical-sheet steel. The sectors are held together by ribs 3 and insulated from one another by an insulating varnish applied in the form of a film over their surfaces.

In order to mount coolers 4, the outer lateral surface of the core 2, between each pair of the adjacent ribs 3, is shaped so that the core 2 thus machined takes the form of a prism, and the coolers 4 are mounted on the core lateral faces. The coolers 4 are each a flat member of rectangular section. Provided in the body of the cooler 4 are ducts 5 serving to pass a cooling medium therethrough, and a through opening 6. The cooler 4 is secured to the outer lateral surface of the core 2 by means of a number of detachable resilient fastening means 7 evenly distributed over the entire length of the cooler 4, FIG. 1 showing only one of the fastening means 7.

The fastening means include each a rigid member 8, a resilient member 9 and an adjusting means 10. The rigid member 8 has a cylindrical portion 11 and a dovetail-like portion 12 mounted in a slot 13 provided in the core 2. The outer lateral surface of the cylinder portion 11 is threaded, the cylindrical portion 11 of the rigid member 8 passing through the opening 6 in the cooler 4.

The resilient member 9 is a disk spring mounted on the cooler 4 in such a manner that its inner surface faces the latter, the cylindrical portion 11 of the rigid member 8 passing through the central opening of the disk spring.

The adjusting means 10 is a nut screwed onto the threaded cylindrical portion 11 of the rigid member 8.

By rotating the adjusting means 10 around the cylindrical portion 11, it is possible to provide a continuous contact between the resilient member 9 and the cooler 4 throughout the operation of the electrical machine stator, which results in a continuous tight contact between the cooler 4 and the outer lateral surface of the core 2.

Figure 2:
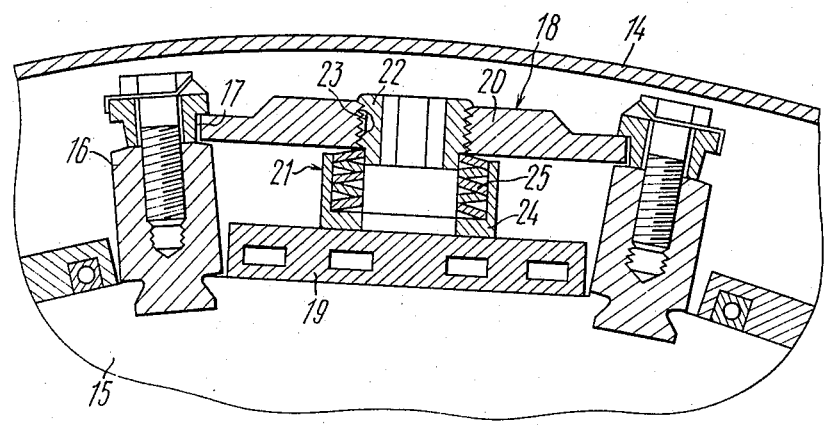
FIG. 2 is an end view, partially in section, of an electrical machine stator embodying another form of the present invention.

In the embodiment shown in FIG. 2, the electrical machine stator comprises a housing 14 accommodating a core 15 having ribs 16 provided with slots 17. Detachable resilient fastening means 18 serve to attach coolers 19 to the outer lateral surface of the core 15.

Each of the detachable resilient fastening means 18 includes a rigid member 20, a reslient member 21 and an adjusting means 22.

The rigid member 20 is a flat plate having its ends entering into the slots 17 of the core ribs 16 and provided with a threaded hole 23 made in the centre of the plate.

The resilient member 21 comprises a cup 24 mounted on the cooler 19 and accommodating a stack of disk springs 25.

The adjusting means 22 is a cylindrical member threaded over its outer surface and screwed into the through threaded hole 23 of the rigid member 20 to be in contact with the upper disk spring 25 of the resilient member 21.

Although the particular embodiments of the invention have been described hereinabove, it will be apparent to those skilled in the art that numerous modifications and other embodiments of the invention may be devised without departing from the true spirit and scope thereof defined by the following claims.

What is claimed is:

1. An electrical machine stator comprising:
   a core,
   coolers,
   detachable resilient fastening means adapted to attach said coolers to the outer lateral surface of said core,
   each of said detachable resilient fastening means including a rigid member attached to said core, a resilient member mounted on said cooler, and an adjusting means movably connected with said rigid member and being in contact with said resilient member to provide continuous pressing of said resilient member to said cooler in a radial direction.

* * * * *